United States Patent
Won

(10) Patent No.: US 12,052,628 B2
(45) Date of Patent: Jul. 30, 2024

(54) METHOD AND APPARATUS FOR SECURITY CONTEXT HANDLING DURING INTER-SYSTEM CHANGE

(71) Applicant: Nokia Technologies Oy, Espoo (FI)

(72) Inventor: Sung Hwan Won, Flower Mound, TX (US)

(73) Assignee: Nokia Technologies Oy, Espoo (FI)

( * ) Notice: Subject to any disclaimer, the term of this patent is extended or adjusted under 35 U.S.C. 154(b) by 400 days.

(21) Appl. No.: 17/281,778

(22) PCT Filed: Oct. 4, 2018

(86) PCT No.: PCT/FI2018/050714
§ 371 (c)(1),
(2) Date: Mar. 31, 2021

(87) PCT Pub. No.: WO2020/070371
PCT Pub. Date: Apr. 9, 2020

(65) Prior Publication Data
US 2021/0385722 A1  Dec. 9, 2021

(51) Int. Cl.
*H04W 36/32* (2009.01)
*H04W 12/03* (2021.01)
*H04W 12/037* (2021.01)
*H04W 12/041* (2021.01)
*H04W 12/108* (2021.01)
(Continued)

(52) U.S. Cl.
CPC ........... *H04W 36/32* (2013.01); *H04W 12/03* (2021.01); *H04W 12/037* (2021.01); *H04W 12/041* (2021.01); *H04W 12/108* (2021.01); *H04W 36/0038* (2013.01); *H04W 60/06* (2013.01)

(58) Field of Classification Search
CPC . H04W 36/32; H04W 12/03; H04W 36/0038; H04W 60/06; H04W 48/04; H04W 12/037; H04W 12/041; H04W 12/108
USPC ......................................................... 370/331
See application file for complete search history.

(56) References Cited

U.S. PATENT DOCUMENTS

2018/0199302 A1  7/2018  Yi et al.

FOREIGN PATENT DOCUMENTS

| CN | 102067642 A | 5/2011 |
| CN | 102187599 A | 9/2011 |

(Continued)

OTHER PUBLICATIONS

Office action received for corresponding Vietnam Patent Application No. 1-2021-01914, dated May 27, 2021, 1 page of office action and 1 page of Translation available.

(Continued)

*Primary Examiner* — Mohammad S Adhami
*Assistant Examiner* — Jesse P. Samluk
(74) *Attorney, Agent, or Firm* — Duft & Bornsen, PC

(57) ABSTRACT

Method and apparatus for deriving a cryptographic protection to a new initial non-access stratum, NAS, message for a target network from an existing security context in an idle mode inter-system change when one or more of conditions a) to d) is met, and for deriving a mapped 5G NAS security context from a source cellular network that is an EPS security context maintained by a source MME of the EPS, in an idle mode inter-system change, when one or more of conditions 1) to 4) is met, optionally after receiving a REGISTRATION REQUEST message without integrity protection and encryption.

18 Claims, 2 Drawing Sheets

(51) Int. Cl.
*H04W 36/00* (2009.01)
*H04W 60/06* (2009.01)

(56) References Cited

FOREIGN PATENT DOCUMENTS

| WO | 2018137824 A1 | 8/2018 |
|---|---|---|
| WO | 2018138348 A1 | 8/2018 |

OTHER PUBLICATIONS

Office action received for corresponding Indian Patent Application No. 202147019334, dated Feb. 14, 2022, 6 pages.

Extended European Search Report received for corresponding European Patent Application No. 18936081.1, dated Apr. 4, 2022, 11 pages.

Office action received for corresponding Japanese Patent Application No. 2021517968, dated Apr. 22, 2022, 4 pages of office action and 3 pages of Translation available.

"3rd Generation Partnership Project; Technical Specification Group Core Network and Terminals; Non-Access-Stratum (NAS) protocol for 5G System (5GS); Stage 3 (Release 15)", 3GPP TS 24.501, V15.0.0, Jun. 2018, pp. 1-338.

"3rd Generation Partnership Project; Technical Specification Group Core Network and Terminals; Non-Access-Stratum (NAS) protocol for Evolved Packet System (EPS); Stage 3(Release 15)", 3GPP TS 24.301, V15.3.0, Jun. 2018, pp. 1-528.

"Establishment of Secure Exchange of NAS Messages during Inter-System Change between N1 Mode and S1 Mode", 3GPP TSG-CT WG1 Meeting #112bis, C1-18gaaa, Nokia, Oct. 15-19, 2018, 6 pages.

"3rd Generation Partnership Project; Technical Specification Group Services and System Aspects;System Architecture for the 5G System; Stage 2(Release 15)", 3GPP TS 23.501, V15.3.0, Sep. 2018, pp. 1-226.

"3rd Generation Partnership Project; Technical Specification Group Core Network and Terminals; Non-Access-Stratum (NAS) protocolfor 5G System (5GS); Stage 3 (Release 15)", 3GPP TS 24.501, V15.1.0, Sep. 2018, pp. 1-398.

International Search Report and Written Opinion received for corresponding Patent Cooperation Treaty Application No. PCT/FI2018/050714, dated Jan. 22, 2019, 19 pages.

"Support for Partial Ciphering for Initial NAS Messages", 3GPP TSG-CT WG1 Meeting #111 bis, Ct-184608, Qualcomm Incorporated, Jul. 9-13, 2018, 22 pages.

"Corrections and Clarifications to Interworking Clauses", 3GPP TSG-SA WG3 Meeting #92, 53-182581, Ericsson, Aug. 20-24, 2018, 10 pages.

"3rd Generation Partnership Project; Technical Specification Group Services and System Aspects;Security architecture and procedures for 5G system(Release 15)", 3GPP TS 33.501, V15.2.0, Sep. 2018, pp. 1-175.

"Session Correlation when N26 is not Deployed", SA WG2 Meeting #124, S2-178501, Agenda : 6.5.9, NTT DOCOMO, Oct. 27-Dec. 1, 2017, pp. 1-14.

Ericsson; Corrections and clarifications to interworking clauses; Aug. 24, 2018.

Indonesian office action; Application P00202102984; Aug. 24, 2023.

Qualcomm Incorporated and Deutsche Telekom; Support for partial ciphering for initial NAS messages; Jul. 13, 2018.

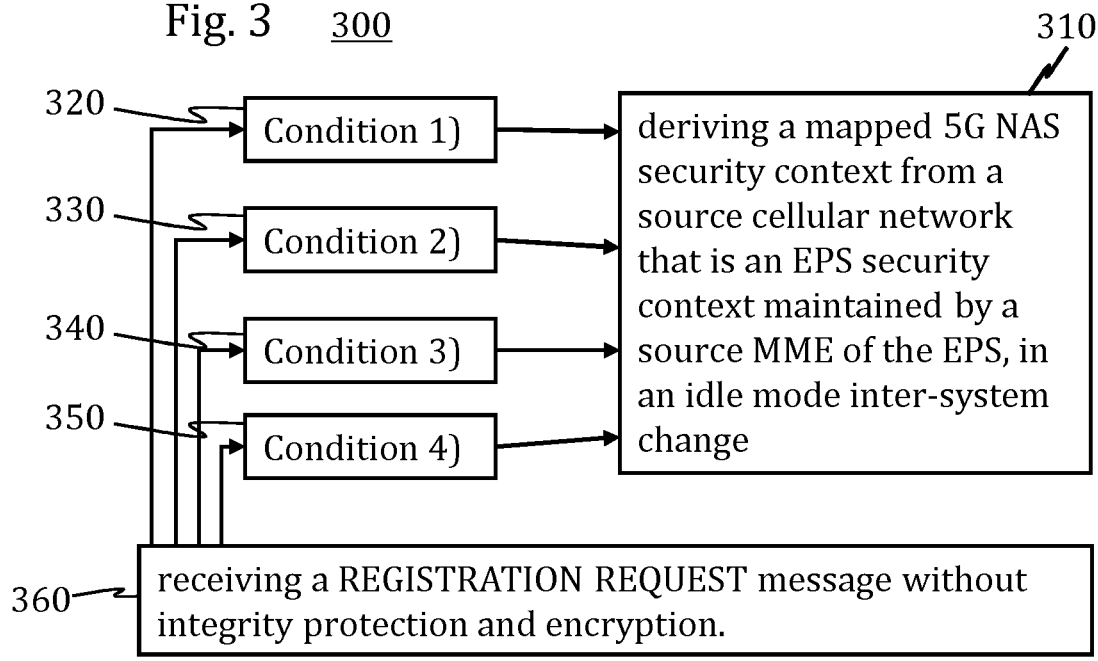
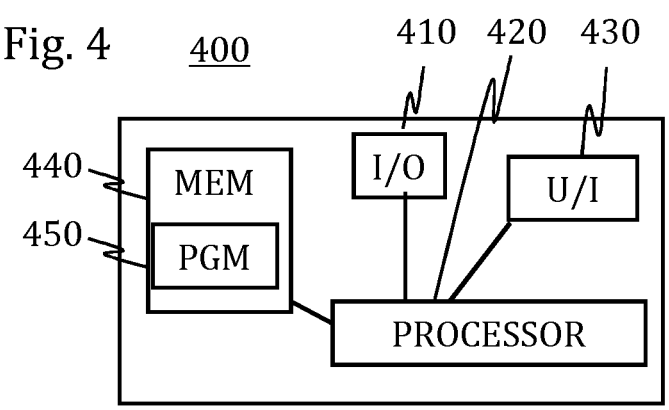

METHOD AND APPARATUS FOR SECURITY CONTEXT HANDLING DURING INTER-SYSTEM CHANGE

RELATED APPLICATION

This application claims priority to PCT Application No. PCT/FI2018/050714, filed on Oct. 4, 2018, which is incorporated herein by reference in its entirety.

TECHNICAL FIELD

Various example embodiments relate to security context handling during inter-system change.

BACKGROUND

This section illustrates useful background information without admission of any technique described herein representative of the state of the art.

Cellular phones have evolved from mobile voice transfer device to omnipotent computers. Wireless data transfer, particularly Internet use, require high data transfer capacity. This trend has driven the development of new cellular telecommunication standards from 2G with GSM towards the 5G that will have exceedingly fast data transfer and now also functions as services that communicate with each other.

Common to previous generations, also in the 5G the privacy and accountability of cellular telecommunications have remained essential. These have been safeguarded by use of cryptography to authenticate the subscriber, authorize telecommunications (and associated charging) and to protect the communications. These measures require signaling in both a core network that contains and manages the infrastructure of a cellular network and also over a radio interface between the mobile stations and the cellular network. All such signaling comes with a computation cost and use of limited signaling resources. The signaling resources are particularly valuable in the radio interface where every symbol used for anything else than transfer of user data reduces the capacity to transfer user data.

3GPP 5G will enhance wireless data transfer speeds also by reducing cell size, which inherently leaves more gaps between cells. The 4G technology will operate as a fallback to provide adequate data access where no 5G is available. At fringes of 5G cells, there may be repeated hand-overs between the 4G and 5G networks so signaling, both in the core network and in the radio access may be rapidly multiplied. In addition, emergency services may not be provided by the 5G network while the 4G network is capable of supporting emergency services especially during early phases of the 5G network deployment. In this case, it is desirable to use the 4G technology as a fallback.

SUMMARY

Various aspects of examples of the invention are set out in the claims.

According to a first example aspect of the present invention, there is provided a method in user equipment, UE, on idle mode inter-system change, while the UE is in a single registration mode, comprising:

deriving a cryptographic protection to a new initial non-access stratum, NAS, message for a target network from an existing security context in an idle mode inter-system change, if any one or more of following conditions are met:

condition a) the source cellular network is an evolved Universal Terrestrial Radio Access Network, e-UTRAN; and the target cellular network is a Next Generation Radio Access Network, ng-RAN; and the UE does not have a valid native 5G NAS security context; and the UE has a packet data network, PDN, connection for emergency bearer services; and the UE has a current Evolved Packet System, EPS, security context including NAS security algorithms set to a null integrity protection algorithm and null ciphering algorithm; and the UE has received an indication that the source cellular network does not support interworking with the target cellular network without a signaling channel between mobility management entities of the source and target cellular networks;

condition b) the source cellular network is the ng-RAN; and the target cellular network is the e-UTRAN; and the UE has received an indication that the source cellular network does not support interworking with the target cellular network without a signaling channel between mobility management entities of the source and target cellular networks;

condition c) the source cellular network is the ng-RAN; and the target cellular network is the e-UTRAN; and the UE does not support sending an ATTACH REQUEST message containing a PDN CONNECTIVITY REQUEST message with request type set to "handover" to transfer a Protocol Data Unit, PDU, session from N1 mode to S1 mode;

condition d) the source cellular network is the ng-RAN; and the target cellular network is the e-UTRAN; and the UE has received an indication that the source cellular network supports interworking with the target cellular network without a signaling channel between mobility management entities of the source and target cellular networks; and the UE supports sending an ATTACH REQUEST message containing a PDN CONNECTIVITY REQUEST message with request type set to "handover" to transfer a PDU session from N1 mode to S1 mode; and the UE has a valid native EPS security context.

The method of the first example aspect may exclude any of following conditions: a); b); c); d); a) and b); a) and c); a) and d); b) and c); b) and d); a) and b) and c); a) and c) and d); b) and c) and d).

The S1 mode may be a mode of a UE allowing access to a 4G core network via a 4G access network. The N1 mode may be a mode of a UE allowing access to a 5G core network via a 5G access network.

The signaling channel between the mobility management entities of the source and target cellular networks may be an N26 interface. The mobility management entity in the 5G network may correspond to the access and mobility management function, AMF.

In case of condition a), the cryptographic protection may be integrity protecting (and partially ciphering, which can be optional) a REGISTRATION REQUEST message with a 5G NAS security context mapped from current EPS security context. The indication defined in condition a) may be received from any of: the source cellular network; the target cellular network; or both the source cellular network and the target cellular network. The null integrity protection algorithm may be EIA0. The null ciphering algorithm may be EEA0.

In case of condition b), the cryptographic protection may be integrity protecting a TRACKING AREA UPDATE REQUEST message with current 5G NAS security context.

The indication defined in condition b) may be received from any of: the source cellular network; the target cellular network; or both the source cellular network and the target cellular network.

In case of condition c), the cryptographic protection may be integrity protecting a TRACKING AREA UPDATE REQUEST message with current 5G NAS security context.

In case of condition d), the cryptographic protection may be integrity protecting an ATTACH REQUEST message with the valid native EPS security context. The indication defined in condition d) may be received from any of: the source cellular network; the target cellular network; or both the source cellular network and the target cellular network.

The ng-RAN may be compliant with 3GPP 5G release 15.

According to a second example aspect of the present invention, there is provided a method in an Access and Mobility Management Function, AMF, for handling an idle mode inter-system change of User Equipment, UE, from an evolved universal terrestrial radio access network, e-UTRAN to a Next Generation Radio Access Network, ng-RAN, while the UE is in a single registration mode connection, comprising:

deriving a mapped 5G Non-Access Stratum, NAS, security context from a source cellular network that is an Evolved Packet System, EPS, security context maintained by a source Mobility Management Entity of the EPS, in an idle mode inter-system change, if any one or more of following conditions are met:

condition 2) interworking without a signaling channel between mobility management entities of the EPS and the fifth Generation system (5GS) is not supported; and an EPS security context received from a Mobility Management Entity, MME, of the EPS includes the NAS security algorithms set to null integrity protection algorithm and null ciphering algorithm, such as EIA0 and EEA0;

condition 2) interworking without a signaling channel between mobility management entities of the EPS and the 5GS is not supported; and an EPS security context received from a Mobility Management Entity, MME, of the EPS includes the NAS security algorithms set to null integrity protection algorithm and null ciphering algorithm, such as EIA0 and EEA0;

condition 3) interworking without a signaling channel between mobility management entities of the EPS and the 5GS is not supported; and an EPS security context received from the source MME does not include the NAS security algorithms set to a null integrity protection algorithm and null ciphering algorithm;

condition 4) interworking without a signaling channel between mobility management entities of the EPS and the 5GS is not supported; and an EPS security context received from the source MME includes the NAS security algorithms set to a null integrity protection algorithm and null ciphering algorithm.

The method may comprise, before the deriving of the mapped security context, receiving the REGISTRATION REQUEST message without integrity protection and encryption.

The method may further comprise that, after receiving the REGISTRATION REQUEST message without integrity protection and encryption, the AMF either creates a fresh mapped 5G NAS security context or trigger a primary authentication and key agreement procedure to create a fresh native 5G NAS security context. In particular, if conditions 1) and 3) are met, the AMF may choose between creating a fresh mapped 5G NAS security context and triggering a primary authentication and key agreement procedure to create a fresh native 5G NAS security context.

The method of the second example aspect may exclude any of following conditions: 1); 2); 3); 4); 1) and 2); 1) and 3); 1) and 4); 2) and 3); 2) and 4); 1) and 2) and 3); 1) and 3) and 4); 2) and 3) and 4).

According to a third example aspect, there is provided a process comprising the first and second example aspects.

According to a fifth example aspect, there is provided an Access and Mobility Management Function, AMF, comprising at least one processor and a memory comprising computer executable program code which, when executed by the at least one processor, is configured to cause the AMF to perform the method of the second example aspect.

According to a sixth example aspect, there is provided an Access and Mobility Management Function, AMF, configured to handle an idle mode inter-system change of User Equipment, UE, from an evolved universal terrestrial radio access network, e-UTRAN, to a Next Generation Radio Access Network, ng-RAN, while the UE is in a single registration mode connection, the AMF comprising:

According to a sixth example aspect, there is provided an Access and Mobility Management Function, AMF, configured to handle an idle mode inter-system change of User Equipment, UE, from an evolved universal terrestrial radio access network, e-UTRAN to a Next Generation Radio Access Network, ng-RAN, while the UE is in a single registration mode connection, the AMF comprising:

means for communicating with an Evolved Packet System, EPS, that comprises the e-UTRAN and for communicating with the UE; and means for deriving a mapped Next Generation Radio Access Network, ng-RAN, Non-Access Stratum, NAS, security context from a source cellular network that is an Evolved Packet System, EPS, security context maintained by a source Mobility Management Entity of the EPS, in an idle mode inter-system change, if any one or more of following conditions are met:

condition 1) the AMF has received from a UE a REGISTRATION REQUEST message without integrity protection and encryption; and the REGISTRATION REQUEST message comprises a Key Set Identifier for Next Generation Radio Access Network, ngKSI, indicating a mapped 5G NAS security context value "000";

condition 2) interworking without a signaling channel between mobility management entities of the EPS and the ng-RAN is not supported; and an EPS security context received from a Mobility Management Entity, MME, of the EPS includes the NAS security algorithms set to null integrity protection algorithm and null ciphering algorithm;

condition 3) interworking without a signaling channel between mobility management entities of the EPS and the ng-RAN is not supported; and an EPS security context received from the source MME does not include the NAS security algorithms set to a null integrity protection algorithm and null ciphering algorithm;

condition 4) interworking without a signaling channel between mobility management entities of the EPS and the ng-RAN is not supported; and an EPS security context received from the source MME includes the NAS security algorithms set to a null integrity protection algorithm and null ciphering algorithm.

The AMF of the fifth or sixth example aspect may be implemented using virtualization. At least some of the structures implementing the AMF may be provided by a virtualization server.

The AMF of the fifth or sixth example aspect may be implemented using clustered processing. At least some of the structures implementing the AMF may be provided by a cluster processing equipment.

The AMF of the fifth or sixth example aspect may be implemented using cloud computing. At least some of the structures implementing the AMF may be provided by a cloud computing system.

According to a seventh example aspect of the present invention, there is provided a system comprising the UE of the fourth example aspect and the AMF of the fifth or sixth example aspect.

The system may further comprise a Mobility Management Entity of the evolved universal terrestrial radio access network.

According to an eighth example aspect of the present invention, there is provided a computer program comprising computer executable program code configured to execute any method of the first or second example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 3 shows a flow chart of a process of an example embodiment in an Access and Mobility Management Function;

FIG. 4 shows a block diagram of an apparatus of an example embodiment.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
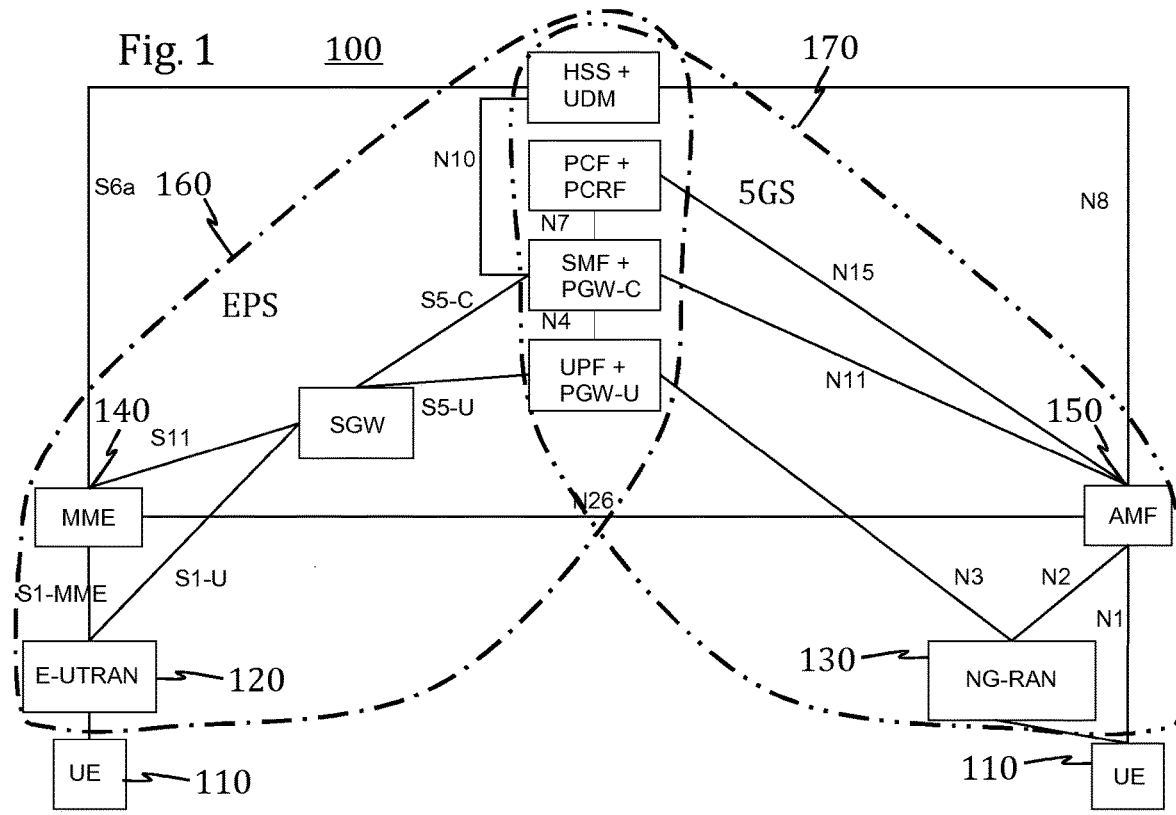
FIG. 1 shows an architectural drawing of a system of an example embodiment.

FIG. 1 shows an architectural drawing of a system 100 of an example embodiment. FIG. 1 shows non-roaming architecture for interworking between 5GS and EPC/E-UTRAN, but suitably demonstrates various network parts and interfaces useful to explain some example embodiments. FIG. 1 shows corresponding parts of Evolved Packet System, EPS, 160 and of a fifth Generation System, 5GS, 170 that are related to EPS and 5GS interworking. It should be appreciated that in practice, the EPS and the 5GS need not comprise functionalities of each other, although it is also possible to implement shared functionalities by shared execution platform, for example.

In FIG. 1, user equipment 110 are in radio access to respective cellular networks that comprise an evolved Universal Terrestrial Radio Access Network, e-UTRAN, 120 and a Next Generation Radio Access Network, ng-RAN, 130. The EPS comprises the e-UTRAN 120 and Evolved Core Network, EPC, parts such as a Mobility Management Entity, MME, 140.

The 5GS 170 comprises the ng-RAN 130 and a 5G core network that comprises, for example, an access and mobility management function, AMF 150.

Figure 2:
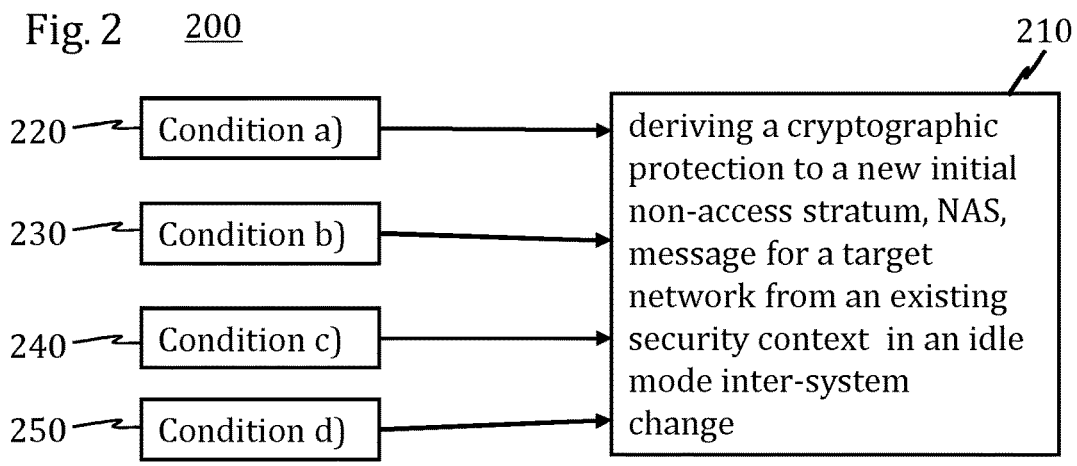
FIG. 2 shows a flow chart of a process of an example embodiment in user equipment.

FIG. 2 shows a flow chart of a process 200 of an example embodiment in user equipment, UE, on idle mode inter-system change, while the UE is in a single registration mode, comprising:

deriving 210 a cryptographic protection to a new initial non-access stratum, NAS, message for a target network from an existing security context in an idle mode inter-system change, if any one or more of following conditions are met:

condition a) 220 the source cellular network is an e-UTRAN; and the target cellular network is an ng-RAN; and the UE does not have a valid native 5G NAS security context; and the UE has a packet data network, PDN, connection for emergency bearer services; and the UE has a current EPS security context including NAS security algorithms set to a null integrity protection algorithm and null ciphering algorithm; and the UE has received an indication that the source cellular network does not support interworking with the target cellular network without a signaling channel between mobility management entities of the source and target cellular networks;

condition b) 230 the source cellular network is the ng-RAN; and the target cellular network is the e-UTRAN; and the UE has received an indication that the source cellular network does not support interworking with the target cellular network without a signaling channel between mobility management entities of the source and target cellular networks;

condition c) 240 the source cellular network is the ng-RAN; and the target cellular network is the e-UTRAN; and the UE does not support sending an ATTACH REQUEST message containing a PDN CONNECTIVITY REQUEST message with request type set to "handover" to transfer a PDU session from N1 mode to S1 mode;

condition d) 250 the source cellular network is the ng-RAN; and the target cellular network is the e-UTRAN; and the UE has received an indication that the source cellular network supports interworking with the target cellular network without a signaling channel between mobility management entities of the source and target cellular networks; and the UE supports sending an ATTACH REQUEST message containing a PDN CONNECTIVITY REQUEST message with request type set to "handover" to transfer a PDU session from N1 mode to S1 mode; and the UE has a valid native EPS security context.

FIG. 3 shows a flow chart of a process of an example embodiment in the AMF, for handling an idle mode inter-system change of the UE, from an e-UTRAN to an ng-RAN, while the UE is in a single registration mode connection, comprising:

deriving 310 a mapped 5G NAS security context from a source cellular network that is an EPS security context maintained by a source MME of the EPS, in an idle mode inter-system change, if any one or more of following conditions are met:

Condition 1) 320 the AMF has received from a UE a REGISTRATION REQUEST message without integrity protection and encryption; and the REGISTRATION REQUEST message comprises a Key Set Identifier for Next Generation Radio Access Network, ngKSI, indicating a mapped 5G NAS security context value "000";

condition 2) 330 interworking without a signaling channel between mobility management entities of the EPS and the 5GS is not supported; and an EPS security context received from an MME of the EPS includes the NAS security algorithms set to null integrity protection algorithm and null ciphering algorithm, such as EIA0 and EEA0;

condition 3) 340 interworking without a signaling channel between mobility management entities of the EPS and the 5GS is not supported; and an EPS security context received from the source MME does not include the NAS security algorithms set to a null integrity protection algorithm and null ciphering algorithm;

condition 4) 350 interworking without a signaling channel between mobility management entities of the EPS and the 5GS is not supported; and an EPS security context received from the source MME includes the NAS security algorithms set to a null integrity protection algorithm and null ciphering algorithm.

The method may comprise, before the deriving of the mapped security context, receiving 360 the REGISTRATION REQUEST message without integrity protection and encryption.

FIG. 4 shows a block diagram of an apparatus 300 according to an embodiment of the invention.

The apparatus 400 comprises a memory 440 including a persistent computer program code 450. The apparatus 400 further comprises a processor 420 for controlling the operation of the apparatus 400 using the computer program code 440, a communication unit 410 for communicating with other nodes. The communication unit 410 comprises, for example, a local area network (LAN) port; a wireless local area network (WLAN) unit; Bluetooth® unit; cellular data communication unit; or satellite data communication unit. The processor 420 comprises, for example, any one or more of: a master control unit (MCU); a microprocessor; a digital signal processor (DSP); an application specific integrated circuit (ASIC); a field programmable gate array; and a microcontroller. The apparatus may further comprise a user interface (U/I) 430.

Some non-limiting example use cases are next described in context of 3GPP Technical Specification (TS) 24.501 V15.1.0 section 4.4.2.5, Establishment of secure exchange of NAS messages Secure exchange of NAS messages via a NAS signaling connection is usually established by the AMF during the registration procedure by initiating a security mode control procedure. After successful completion of the security mode control procedure, all NAS messages exchanged between the UE and the AMF are sent integrity protected using the current 5G security algorithms, and except for the messages such as REGISTRATION REQUEST and SECURITY MODE COMMAND messages, all NAS messages exchanged between the UE and the AMF are sent ciphered using the current 5G security algorithms. During inter-system change from S1 mode to N1 mode in 5GMM-CONNECTED mode (where 5GMM refers to 5GS Mobility Management), secure exchange of NAS messages is established between the AMF and the UE by:

a) the transmission of NAS security related parameters encapsulated in the Access Stratum (AS) signaling from the AMF to the UE triggering the inter-system change in 5GMM-CONNECTED mode. The UE uses these parameters to generate the mapped 5G NAS security context; and b) after the inter-system change in 5GMM-CONNECTED mode, the transmission of a REGISTRATION REQUEST message from the UE to the AMF. The UE shall send this message integrity protected using the mapped 5G NAS security context, but unciphered. From this time onward, all NAS messages exchanged between the UE and the AMF are sent integrity protected using the mapped 5G NAS security context, and except for the messages such as REGISTRATION REQUEST and SECURITY MODE COMMAND messages, all NAS messages exchanged between the UE and the AMF are sent ciphered using the mapped 5G NAS security context.

During inter-system change from S1 mode to N1 mode in 5GMM-IDLE mode, if the UE is operating in single-registration mode and:

a) if the UE has a valid native 5G NAS security context, the UE shall transmit a REGISTRATION REQUEST message integrity protected with the native 5G NAS security context. The UE shall include the ngKSI indicating the native 5G NAS security context value in the REGISTRATION REQUEST message.

After receiving the REGISTRATION REQUEST message including the ngKSI indicating a native 5G NAS security context value, the AMF shall check whether the ngKSI included in the REGISTRATION REQUEST message belongs to a 5G NAS security context available in the AMF, and shall verify the message authentication code (MAC) of the REGISTRATION REQUEST message. If the verification is successful, the AMF deletes the EPS security context received from the source MME if any, and the AMF re-establishes the secure exchange of NAS messages by either:

i) replying with a REGISTRATION ACCEPT message that is integrity protected and ciphered using the native 5G NAS security context. From this time onward, all NAS messages exchanged between the UE and the AMF are sent integrity protected and except for the messages such as REGISTRATION REQUEST and SECURITY MODE COMMAND messages, all NAS messages exchanged between the UE and the AMF are sent ciphered; or ii) initiating a security mode control procedure. This can be used by the AMF to take a non-current 5G NAS security context into use or to modify the current 5G NAS security context by selecting new NAS security algorithms.

b) if the UE has no valid native 5G NAS security context and:
  i) if the UE has no PDN connection for emergency bearer services, the UE has a current EPS security context not including the NAS security algorithms set to EIA0 and EEA0, or the UE received an "interworking without N26 supported" indication from the network, the UE shall send the REGISTRATION REQUEST message without integrity protection and encryption.
    After receiving the REGISTRATION REQUEST message without integrity protection and encryption:
    1) if interworking without N26 is not supported, the AMF shall either create a fresh mapped 5G NAS security context or trigger a primary authentication and key agreement procedure to create a fresh native 5G NAS security context; or
    2) if interworking without N26 is supported, the AMF shall trigger a primary authentication and key agreement procedure.
    The newly created 5G NAS security context is taken into use by initiating a security mode control procedure and this context becomes the current 5G NAS security context in both the UE and the AMF. This re-establishes the secure exchange of NAS messages; or
  ii) if the UE has a PDN connection for emergency bearer services, the UE has a current EPS security context including the NAS security algorithms set to EIA0 and EEA0, and the UE received an "interworking without N26 not supported" indication from the network, the UE shall derive a mapped 5G NAS security from the current EPS security context and transmit a REGISTRATION REQUEST message integrity protected with the mapped 5G NAS security context. The UE shall include the ngKSI indicating the mapped 5G NAS security context value in the REGISTRATION REQUEST message.
    After receiving the REGISTRATION REQUEST message including the ngKSI indicating the mapped 5G NAS security context value "000", the AMF not supporting interworking without N26 shall derive a mapped 5G NAS security context from the EPS security context and check whether the ngKSI included in the REGISTRATION REQUEST message matches the ngKSI of the mapped 5G NAS security context. If the check is successful, the AMF re-establishes the secure exchange of NAS messages by replying with a REGISTRATION ACCEPT message that is integrity protected and ciphered using the mapped 5G NAS security context.
b) if the UE operating in single-registration mode has no valid native 5G NAS security context, the UE shall send the REGISTRATION REQUEST message without integrity protection and encryption.
  After receiving the REGISTRATION REQUEST message without integrity protection and encryption:
  i) if interworking without N26 is not supported and:
    1) if an EPS security context received from the source MME does not include the NAS security algorithms set to EIA0 and EEA0, the AMF shall either create a fresh mapped 5G NAS security context or trigger a primary authentication and key agreement procedure to create a fresh native 5G NAS security context; or
    2) if an EPS security context received from the source MME includes the NAS security algorithms set to EIA0 and EEA0, the AMF shall create a fresh mapped 5G NAS security; or
  ii) if interworking without N26 is supported, the AMF shall trigger a primary authentication and key agreement procedure.
    The newly created 5G NAS security context is taken into use by initiating a security mode control procedure and this context becomes the current 5G NAS security context in both the UE and the AMF. This re-establishes the secure exchange of NAS messages.

During inter-system change from N1 mode to S1 mode in 5GMM-CONNECTED mode, secure exchange of NAS messages is established between the MME and the UE by:
  a) the transmission of NAS security related parameters encapsulated in the AS signaling from the AMF to the UE triggering the inter-system change in 5GMM-CONNECTED mode. The UE uses these parameters to generate the mapped EPS security context; and
  b) after the inter-system change in 5GMM-CONNECTED mode, the transmission of a TRACKING AREA UPDATE REQUEST message from the UE to the MME. The UE shall send this message integrity protected using the mapped EPS security context, but unciphered. From this time onward, all NAS messages exchanged between the UE and the AMF are sent integrity protected using the mapped EPS security context, and except for the messages such as REGISTRATION REQUEST and SECURITY MODE COMMAND message, all NAS messages exchanged between the UE and the AMF are sent ciphered using the mapped EPS security context.

During inter-system change from N1 mode to S1 mode in 5GMM-IDLE mode, if the UE is operating in the single-registration mode and:
  a) if the UE received an "interworking without N26 not supported" indication from the network or the UE does not support sending an ATTACH REQUEST message containing a PDN CONNECTIVITY REQUEST message with request type set to "handover" to transfer a PDU session from N1 mode to S1 mode, the UE shall transmit a TRACKING AREA UPDATE REQUEST message integrity protected with the current 5G NAS security context and the UE shall derive a mapped EPS security context. The UE shall include the eKSI (key set identifier) indicating the mapped EPS security context value in the TRACKING AREA UPDATE REQUEST message.
    After receiving the TRACKING AREA UPDATE REQUEST message including the eKSI, the MME forwards the TRACKING AREA UPDATE REQUEST message to the source AMF. The source AMF shall use the eKSI value field to identify a 5G NAS security context available in the AMF, and shall verify the MAC of the TRACKING AREA UPDATE REQUEST message using the 5G NAS security context. If the verification is successful, the AMF shall derive a mapped EPS security context from the 5G NAS security context and send the mapped EPS security context to the MME. The MME re-establishes the secure exchange of NAS messages by either:
    i) replying with a TRACKING AREA UPDATE ACCEPT message that is integrity protected and ciphered using the mapped 5G NAS security context.

From this time onward, all NAS messages exchanged between the UE and the MME are sent integrity protected and except for the messages such as ATTACH REQUEST and TRACKING AREA UPDATE REQUEST messages, all NAS messages exchanged between the UE and the MME are sent ciphered; or ii) initiating a security mode control procedure. This can be used by the MME to take a non-current EPS security context into use or to modify the current EPS security context by selecting new NAS security algorithms.

b) if the UE received an "interworking without N26 supported" indication from the network and the UE supports sending an ATTACH REQUEST message containing a PDN CONNECTIVITY REQUEST message with request type set to "handover" to transfer a PDU session from N1 mode to S1 mode and:

i) if the UE has a valid native EPS security context, the UE shall send an ATTACH REQUEST message integrity protected with the native EPS security context. The UE shall include the eKSI indicating the native EPS security context value in the ATTACH REQUEST message.

ii) if the UE has no valid native EPS security context, the UE shall send an ATTACH REQUEST message without integrity protection and encryption.

After receiving the ATTACH REQUEST message, the MME shall proceed with the attach procedure.

During an N1 mode to N1 mode handover, secure exchange of NAS messages is established between the AMF and the UE by:

a) the transmission of NAS security related parameters encapsulated in the AS signaling from the target AMF to the UE triggering the N1 mode to N1 mode handover. The UE uses these parameters to create a new 5G NAS security context.

The secure exchange of NAS messages shall be continued after N1 mode to N1 mode handover. It is terminated after inter-system change from N1 mode to S1 mode in 5GMM-CONNECTED mode or when the NAS signaling connection is released. When a UE in 5GMM-IDLE mode establishes a new NAS signaling connection and has a valid current 5G NAS security context, the UE shall transmit the initial NAS message integrity protected with the current 5G NAS security context, but unciphered. The UE shall include the ngKSI indicating the current 5G NAS security context value in the initial NAS message. The AMF shall check whether the ngKSI included in the initial NAS message belongs to a 5G NAS security context available in the AMF, and shall verify the MAC of the NAS message. If the verification is successful, the AMF may re-establish the secure exchange of NAS messages:

a) by replying with a NAS message that is integrity protected and ciphered using the current 5G NAS security context. From this time onward, all NAS messages exchanged between the UE and the AMF are sent integrity protected and except for the messages such as REGISTRATION REQUEST and SECURITY MODE COMMAND message, all NAS messages exchanged between the UE and the AMF are sent ciphered; or b) by initiating a security mode control procedure. This can be used by the AMF to take a non-current 5G NAS security context into use or to modify the current 5G NAS security context by selecting new NAS security algorithms.

As used in this application, the term "circuitry" may refer to one or more or all of the following:

(a) hardware-only circuit implementations (such as implementations in only analog and/or digital circuitry) and;

(b) combinations of hardware circuits and software, such as (as applicable)

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that it may be possible to avoid unnecessary 5GMM procedures being initiated which results in worsening user experience for a critical call. Another technical effect of one or more of the example embodiments disclosed herein is that radio interface and/or core network signaling may be reduced. Yet another technical effect of one or more of the example embodiments disclosed herein is that security may be improved by increasing use of previously established security contexts so that clear text transmission of data may be reduced over radio interface and/or in one or more core networks.

Embodiments of the present invention may be implemented in software, hardware, application logic or a combination of software, hardware and application logic, In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A method in user equipment, the method comprising:
establishing, when in N1 mode, a native 5G non-access stratum security context with an access and mobility management function of a 5G system resulting from a primary authentication and key agreement procedure between the access and mobility management function and the user equipment;
establishing, when in S1 mode, a mapped 5G non-access stratum security context from an evolved packet system security context; and
during inter-system change of the user equipment from the S1 mode to the N1 mode while the user equipment is in idle mode and when the user equipment is operating in single-registration mode,
sending a registration request message to the access and mobility management function that is integrity protected with the native 5G non-access stratum security context when the user equipment has a valid native 5G non-access stratum security context; and
sending the registration request message to the access and mobility management function without integrity protection and encryption when the user equipment has no valid native 5G non-access stratum security context.

2. The method of claim 1, wherein the S1 mode is a mode of the user equipment allowing access to a 4G core network via a 4G access network and the N1 mode is a mode of the user equipment allowing access to a 5G core network via a 5G access network.

3. The method of claim 1, further comprising:
including a next generation key set identifier in the registration request message indicating a native 5G non-access stratum security context value when the user equipment has a valid native 5G non-access stratum security context.

4. The method of claim 1, further comprising:
during inter-system change from the N1 mode to the S1 mode while the user equipment is in idle mode and when the user equipment is operating in single-registration mode,
sending a tracking area update request message to a mobility management entity of an evolved packet system that is integrity protected with the native 5G non-access stratum security context when a tracking area update procedure is initiated;
sending an attach request message to the mobility management entity that is integrity protected with a native evolved packet system security context when an attach procedure is initiated and when the user equipment has a valid native evolved packet system security context; and
sending the attach request message to the mobility management entity without integrity protection and encryption when the attach procedure is initiated and when the user equipment has no valid native evolved packet system security context.

5. The method of claim 4, further comprising:
including a non-access stratum key set identifier in the tracking area update request message indicating a native 5G non-access stratum security context value.

6. The method of claim 4, further comprising:
deriving a mapped evolved packet system security context when sending the tracking area update request message.

7. A method in an access and mobility management function of a 5G system, the method comprising:
establishing, when user equipment is in N1 mode, a native 5G non-access stratum security context with the user equipment resulting from a primary authentication and key agreement procedure between the access and mobility management function and the user equipment;
establishing, when the user equipment is in S1 mode, a mapped 5G non-access stratum security context from an evolved packet system security context; and
during inter-system change of the user equipment from the S1 mode to the N1 mode while the user equipment is in idle mode and when the user equipment is operating in single-registration mode,
receiving a registration request message from the user equipment that is integrity protected with the native 5G non-access stratum security context;
verifying a message authentication code of the registration request message;
deleting the evolved packet system security context when verification of the message authentication code is successful; and
re-establishing secure exchange of non-access stratum messages by performing one of:
replying to the user equipment with a registration accept message that is integrity protected and ciphered using the native 5G non-access stratum security context; or
initiating a security mode control procedure.

8. The method of claim 7 further comprising:
receiving the registration request message from the user equipment without integrity protection and encryption; and
when an N26 interface is supported with a mobility management entity of an evolved packet system, performing one of:
creating a fresh mapped 5G non-access stratum security context or triggering the primary authentication and key agreement procedure to create a fresh native 5G non-access stratum security context when the evolved packet system security context received from the mobility management entity does not include non-access stratum security algorithms set to EIA0 and EEA0; or
triggering the primary authentication and key agreement procedure to create a fresh native 5G non-access stratum security context when the evolved packet system security context received from the mobility management entity includes the non-access stratum security algorithms set to EIA0 and EEA0.

9. The method of claim 8, further comprising:
when the N26 interface is not supported:
triggering the primary authentication and key agreement procedure.

10. User equipment comprising at least one processor and at least one memory including computer program code, the at least one memory and the computer program code configured to, with the at least one processor, cause the user equipment at least to:

establish, when in N1 mode, a native 5G non-access stratum security context with an access and mobility management function of a 5G system resulting from a primary authentication and key agreement procedure between the access and mobility management function and the user equipment;

establish, when in S1 mode, a mapped 5G non-access stratum security context from an evolved packet system security context; and during inter-system change of the user equipment from the S1 mode to the N1 mode while the user equipment is in idle mode and when the user equipment is operating in single-registration mode, send a registration request message to the access and mobility management function that is integrity protected with the native 5G non-access stratum security context when the user equipment has a valid native 5G non-access stratum security context; and send the registration request message to the access and mobility management function without integrity protection and encryption when the user equipment has no valid native 5G non-access stratum security context.

11. The user equipment of claim 10, wherein the S1 mode is a mode of the user equipment allowing access to a 4G core network via a 4G access network and the N1 mode is a mode of the user equipment allowing access to a 5G core network via a 5G access network.

12. The user equipment of claim 10, wherein the at least one memory and the computer program code is further configured to, with the at least one processor, cause the user equipment at least to:

include a next generation key set identifier in the registration request message indicating a native 5G non-access stratum security context value when the user equipment has a valid native 5G non-access stratum security context.

13. The user equipment of claim 10, wherein the at least one memory and the computer program code is further configured to, with the at least one processor, cause the user equipment at least to:

during inter-system change from the N1 mode to the S1 mode while the user equipment is in idle mode and when the user equipment is operating in single-registration mode, send a tracking area update request message to a mobility management entity of an evolved packet system that is integrity protected with the 5G non-access stratum security context when a tracking area update procedure is initiated;

send an attach request message to the mobility management entity that is integrity protected with a native evolved packet system security context when an attach procedure is initiated and when the user equipment has a valid native evolved packet system security context; and send the attach request message to the mobility management entity without integrity protection and encryption when the attach procedure is initiated and when the user equipment has no valid native evolved packet system security context.

14. The user equipment of claim 13, wherein the at least one memory and the computer program code is further configured to, with the at least one processor, cause the user equipment at least to:

include a non-access stratum key set identifier in the tracking area update request message indicating a native 5G non-access stratum security context value.

15. An access and mobility management function of a 5G system, comprising at least one processor and at least one memory including computer program code, the at least one memory and the computer program code configured to, with the at least one processor, cause the access and mobility management function at least to:

establish, when user equipment is in N1 mode, a native 5G non-access stratum security context with the user equipment resulting from a primary authentication and key agreement procedure between the access and mobility management function and the user equipment;

establish, when the user equipment is in S1 mode, a mapped 5G non-access stratum security context from an evolved packet system security context; and during inter-system change of the user equipment from the S1 mode to the N1 mode while the user equipment is in idle mode and when the user equipment is operating in single-registration mode, receive a registration request message from the user equipment that is integrity protected with the native 5G non-access stratum security context;

verify a message authentication code of the registration request message;

delete the evolved packet system security context when verification of the message authentication code is successful; and re-establish secure exchange of non-access stratum messages by performing one of:

replying to the user equipment with a registration accept mess age that is integrity protected and ciphered using the native 5G non-access stratum security context; or initiating a security mode control procedure.

16. The access and mobility management function of claim 15, wherein the at least one memory and the computer program code is further configured to, with the at least one processor, cause the access and mobility management function at least to:

receive the registration request message from the user equipment without integrity protection and encryption; and when an N26 interface is supported with a mobility management entity of an evolved packet system, perform one of:

creating a fresh mapped 5G non-access stratum security context or triggering the primary authentication and key agreement procedure to create a fresh native 5G non-access stratum security context when the evolved packet system security context received from the mobility management entity does not include non-access stratum security algorithms set to EIA0 and EEA0; or triggering the primary authentication and key agreement procedure to create a fresh native 5G non-access stratum security context when the evolved packet system security context received from the mobility management entity includes the non-access stratum security algorithms set to EIA0 and EEA0.

17. The access and mobility management function of claim 16, wherein the at least one memory and the computer program code is further configured to, with the at least one processor, cause the access and mobility management function at least to:

when the N26 interface is not supported, perform:
   triggering the primary authentication and key agreement procedure.

18. The user equipment of claim 13, wherein the at least one memory and the computer program code is further configured to, with the at least one processor, cause the user equipment at least to:
   derive a mapped evolved packet system security context when sending the tracking area update request message.

* * * * *